(12) United States Patent
Deulgaonkar et al.

(10) Patent No.: US 9,798,891 B2
(45) Date of Patent: Oct. 24, 2017

(54) METHODS AND SYSTEMS FOR SERVICE LEVEL OBJECTIVE API FOR STORAGE MANAGEMENT

(71) Applicant: NETAPP, INC., Sunnyvale, CA (US)

(72) Inventors: Ameet Deulgaonkar, Bangalore (IN); Swaminathan Ramany, Cupertino, CA (US)

(73) Assignee: NETAPP, INC., Sunnyvale, CA (US)

( * ) Notice: Subject to any disclaimer, the term of this patent is extended or adjusted under 35 U.S.C. 154(b) by 204 days.

(21) Appl. No.: 14/881,427

(22) Filed: Oct. 13, 2015

(65) Prior Publication Data

US 2017/0103223 A1 Apr. 13, 2017

(51) Int. Cl.
*G06F 21/62* (2013.01)
*G06F 9/54* (2006.01)

(52) U.S. Cl.
CPC .......... *G06F 21/6218* (2013.01); *G06F 9/544* (2013.01)

(58) Field of Classification Search
None
See application file for complete search history.

(56) References Cited

U.S. PATENT DOCUMENTS 7,870,300 B2  1/2011  Helman et al.
8,429,097 B1 * 4/2013 Sivasubramanian  G06F 17/30483
                                                706/12
2004/0233910 A1  11/2004 Chen et al.
2006/0004820 A1 * 1/2006 Claudatos ......... G06F 17/30085
2006/0004868 A1 * 1/2006 Claudatos ......... G06F 17/30085
2008/0201417 A1  8/2008 McCain et al.
2009/0216778 A1  8/2009 Szyperski et al.
2010/0250748 A1  9/2010 Sivasubramanian et al.
2016/0162189 A1  6/2016 Malwankar

OTHER PUBLICATIONS

Non-Final Office Action on co-pending (U.S. Appl. No. 14/814,877) dated Aug. 25, 2017.
Non-Final Office Action on co-pending (U.S. Appl. No. 14/868,716) dated Aug. 28, 2017.

* cited by examiner

*Primary Examiner* — Kaveh Abrishamkar
(74) *Attorney, Agent, or Firm* — Klein, O'Neill & Singh, LLP

(57) ABSTRACT

Methods and systems for a networked storage environment are provided. For example, one method includes generating by a processor in response to a request, a storage service level class (SLC) defined by a storage attribute and a protection SLC defined by a protection attribute for a storage item managed by a storage server, where the storage attribute provides a performance level for the storage item and the protection attribute provides a protection level for the storage item; identifying by the processor, a first resource for complying with the storage attribute of the storage SLC for storing the storage item; configuring a second resource for complying with the protection attribute of the protection SLC for storing information associated with the storage item; and monitoring the first resource for compliance with the storage attribute for the storage SLC.

20 Claims, 9 Drawing Sheets

METHODS AND SYSTEMS FOR SERVICE LEVEL OBJECTIVE API FOR STORAGE MANAGEMENT

TECHNICAL FIELD

The present disclosure relates to a networked storage environment for managing service level objectives.

BACKGROUND

Various forms of storage systems are used today. These forms include direct attached storage (DAS) network attached storage (NAS) systems, storage area networks (SANs), and others. Network storage systems are commonly used for a variety of purposes, such as providing multiple clients with access to shared data, backing up data and others.

A storage system typically includes at least one computing system executing a storage operating system for storing and retrieving data on behalf of one or more client computing systems ("clients"). The storage operating system stores and manages shared data containers in a set of mass storage devices.

Clients or users that use storage space often need an assured performance level. The performance level may be defined using different parameters, for example, throughput, latency and other parameters. Throughput means a number of input/output (I/O) requests for reading and writing data that can be processed within a given duration (IOPS) and latency means delay in processing I/O requests. Managing user expectations in extensive networked storage environments is challenging because there are numerous components/devices/connections. Continuous efforts are being made to manage storage environments that can efficiently meet user expectations.

BRIEF DESCRIPTION OF THE DRAWINGS

The various features of the present disclosure will now be described with reference to the drawings of the various aspects disclosed herein. In the drawings, the same components may have the same reference numerals. The illustrated aspects are intended to illustrate, but not to limit the present disclosure. The drawings include the following Figures.

DETAILED DESCRIPTION

As a preliminary note, the terms "component", "module", "system," and the like as used herein are intended to refer to a computer-related entity, either software-executing general purpose processor, hardware, firmware and a combination thereof. For example, a component may be, but is not limited to being, a process running on a hardware processor, a hardware processor, an object, an executable, a thread of execution, a program, and/or a computer.

By way of illustration, both an application running on a server and the server can be a component. One or more components may reside within a process and/or thread of execution, and a component may be localized on one computer and/or distributed between two or more computers. Also, these components can execute from various computer readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal).

Computer executable components can be stored, for example, at non-transitory, computer readable media including, but not limited to, an ASIC (application specific integrated circuit), CD (compact disc), DVD (digital video disk), ROM (read only memory), floppy disk, hard disk, EEPROM (electrically erasable programmable read only memory), memory stick or any other storage device, in accordance with the claimed subject matter.

In one aspect, methods and systems for a networked storage environment are provided. For example, one method includes generating by a processor in response to a request, a storage service level class (SLC) defined by a storage attribute and a protection SLC defined by a protection attribute for a storage item managed by a storage server, where the storage attribute provides a performance level for the storage item and the protection attribute provides a protection level for the storage item; identifying by the processor, a first resource for complying with the storage attribute of the storage SLC for storing the storage item; configuring a second resource for complying with the protection attribute of the protection SLC for storing information associated with the storage item; and monitoring the first resource for compliance with the storage attribute for the storage SLC.

Figure 1A:
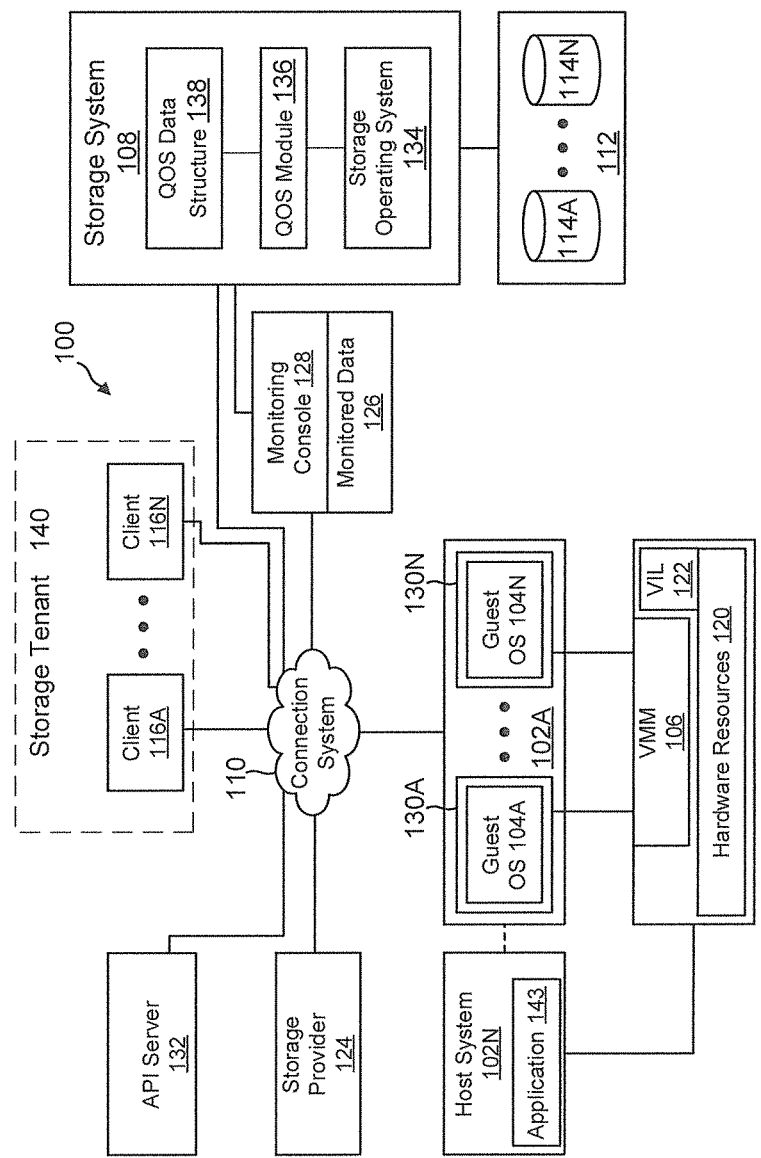
FIG. 1A shows an example of an operating environment for the various aspects disclosed herein.

System 100:

FIG. 1A shows an example of a system 100, where the adaptive aspects disclosed herein may be implemented. In one aspect, system 100 may include a plurality of computing devices 102A-102N (may also be referred to individually as a host platform/system 102 or simply as server 102) communicably coupled to a storage system 108 executing a storage operating system 134 via a connection system 110 such as a local area network (LAN), wide area network (WAN), the Internet and others. As described herein, the term "communicably coupled" may refer to a direct connection, a network connection, or other connections to enable communication between devices.

As an example, host system 102A executes a plurality of virtual machines (VMs) in virtual environment that is described below in detail. Host 102N may execute one or more application 143, for example, a database application, an email application and other. The VMs and applications may be used to read and write data at the storage devices of the storage system 108.

Clients 116A-116N (may be referred to as client (or user) 116) are computing devices that can access storage space at the storage system 108. A client can be the entire system of a company, a department, a project unit or any other entity. Each client is uniquely identified and optionally, may be a part of a logical structure called a storage tenant 140. The storage tenant 140 represents a set of users (may be referred to as storage consumers) for a storage provider 124 (may also be referred to as a cloud manager, where cloud computing is being utilized). Where a storage provider 124 is being used, the client accesses storage and protection levels through the storage provider. For example, the storage provider 124 may set limits to storage space, throughput and latency for a client. It is noteworthy that the adaptive aspects of the present disclosure are not limited to using a storage provider.

System 100 includes an application programming interface (API) server 132 that allows clients and/or storage provider to interact with storage related services. Details regarding the API server 132 are provided below.

In one aspect, storage system 108 has access to a set of mass storage devices 114A-114N (may be referred to as storage devices 114) within at least one storage subsystem 112. The mass storage devices 114 may include writable storage device media such as magnetic disks, video tape, optical, DVD, magnetic tape, non-volatile memory devices for example, solid state drives (SSDs) including self-encrypting drives, flash memory devices and any other similar media adapted to store information. The storage devices 114 may be organized as one or more groups of Redundant Array of Independent (or Inexpensive) Disks (RAID). The various aspects disclosed are not limited to any particular storage device type or storage device configuration.

In one aspect, the storage system 108 provides a set of logical storage volumes (or logical unit numbers (LUNs)) that presents storage space to the storage provider 124, clients and VMs for storing information. Each volume may be configured to store data files (or data containers or data objects), scripts, word processing documents, executable programs, and any other type of structured or unstructured data. From the perspective of one of the client systems, each volume can appear to be a single drive. However, each volume can represent storage space in at one storage device, an aggregate of some or all of the storage space in multiple storage devices, a RAID group, or any other suitable set of storage space.

The storage operating system 134 organizes storage space at storage devices 114 as one or more "aggregate", where each aggregate is identified by a unique identifier and a location. Within each aggregate, one or more storage volumes are created whose size can be varied. A qtree, sub-volume unit may also be created within the storage volumes. As a special case, a qtree may be an entire storage volume.

The storage system 108 may be used to store and manage information at storage devices 114 based on a request. The request may be based on file-based access protocols, for example, the Common Internet File System (CIFS) protocol or Network File System (NFS) protocol, over the Transmission Control Protocol/Internet Protocol (TCP/IP). Alternatively, the request may use block-based access protocols, for example, the Small Computer Systems Interface (SCSI) protocol encapsulated over TCP (iSCSI) and SCSI encapsulated over Fibre Channel (FCP).

In a typical mode of operation, a client transmits one or more input/output (I/O) commands, such as a CFS or NFS request, over connection system 110 to the storage system 108. Storage system 108 receives the request, issues one or more I/O commands to storage devices 114 to read or write the data on behalf of the client system, and issues a CIFS or NFS response containing the requested data over the network 110 to the respective client system.

Although storage system 108 is shown as a stand-alone system, i.e. a non-cluster based system, in another aspect, storage system 108 may have a distributed architecture; for example, a cluster based system that is described below in detail with respect to FIG. 2A.

System 100 includes a monitoring console 128 that interfaces with the storage operating system 134 for sending and receiving performance data that may also be referred to as quality of service (QOS) data. QOS at the storage system level may be implemented by a QOS module 136 that maintains one or more QOS data structure (or performance data structure) 138. QOS module 136 is used to implement a guaranteed latency and/or a throughput rate for processing input/output (I/O) requests.

The term guaranteed latency as used herein means that a VM or client is guaranteed that an I/O request will be processed within certain duration. The term guaranteed throughput as used herein means a guaranteed number of IOPS (input/output operations per second) that are processed for a client. Throughput may be expressed as an absolute value or as a percentile metric (for example, a certain percentage of the total number of requests).

QOS module 136 stores QOS data at data structure 138. The data structure 138 identifies each storage volume and the associated latency and throughput. QOS module 136 provides this information to the storage operating system 134 such that storage operating system 134 can prioritize and process I/O requests based on the latency and throughput rates associated with the storage volumes. The storage operating system 134 maintains a plurality of queues (not shown) for providing QOS for each storage volume. The monitoring console 128 obtains QOS data from storage operating system 134 and stores it at a data structure 126.

As an example, system 100 may also include a virtual machine environment where a physical resource is time-shared among a plurality of independently operating processor executable virtual machines (VMs). Each VM may function as a self-contained platform, running its own operating system (OS) and computer executable, application software. The computer executable instructions running in a VM may be collectively referred to herein as "guest software." In addition, resources available within the VM may be referred to herein as "guest resources."

The guest software expects to operate as if it were running on a dedicated computer rather than in a VM. That is, the guest software expects to control various events and have access to hardware resources on a physical computing system (may also be referred to as a host platform) which maybe referred to herein as "host hardware resources". The host hardware resource may include one or more processors, resources resident on the processors (e.g., control registers, caches and others), memory (instructions residing in memory, e.g., descriptor tables), and other resources (e.g., input/output devices, host attached storage, network attached storage or other like storage) that reside in a physical machine or are coupled to the host platform.

Host platform 102A includes/provides a virtual machine environment executing a plurality of VMs 130A-130N that may be presented to client computing devices/systems 116A-116N. VMs 130A-130N execute a plurality of guest OS 104A-104N (may also be referred to as guest OS 104) that share hardware resources 120. Application 143 may be executed within VMs 130. As described above, hardware resources 120 may include storage, CPU, memory, I/O devices or any other hardware resource.

In one aspect, host platform 102A interfaces with a virtual machine monitor (VMM) 106, for example, a processor executed Hyper-V layer provided by Microsoft Corporation of Redmond, Wash., a hypervisor layer provided by VMWare Inc., or any other type. VMM 106 presents and manages the plurality of guest OS 104A-104N executed by the host platform 102. The VMM 106 may include or interface with a virtualization layer (VIL) 122 that provides one or more virtualized hardware resource to each OS 104A-104N.

In one aspect, VMM 106 is executed by host platform 102A with VMs 130A-130N. In another aspect, VMM 106 may be executed by an independent stand-alone computing system, referred to as a hypervisor server or VMM server and VMs 130A-130N are presented at one or more computing systems.

It is noteworthy that different vendors provide different virtualization environments, for example, VMware Corporation, Microsoft Corporation and others. Data centers may have hybrid virtualization environments/technologies, for example, Hyper-V and hypervisor based virtual environment. The generic virtualization environment described above with respect to FIG. 1A may be customized depending on the virtual environment to implement the aspects of the present disclosure. Furthermore, VMM 106 (or VIL 122) may execute other modules, for example, a storage driver, network interface and others, the details of which are not germane to the aspects described herein and hence have not been described in detail.

Figure 1B:
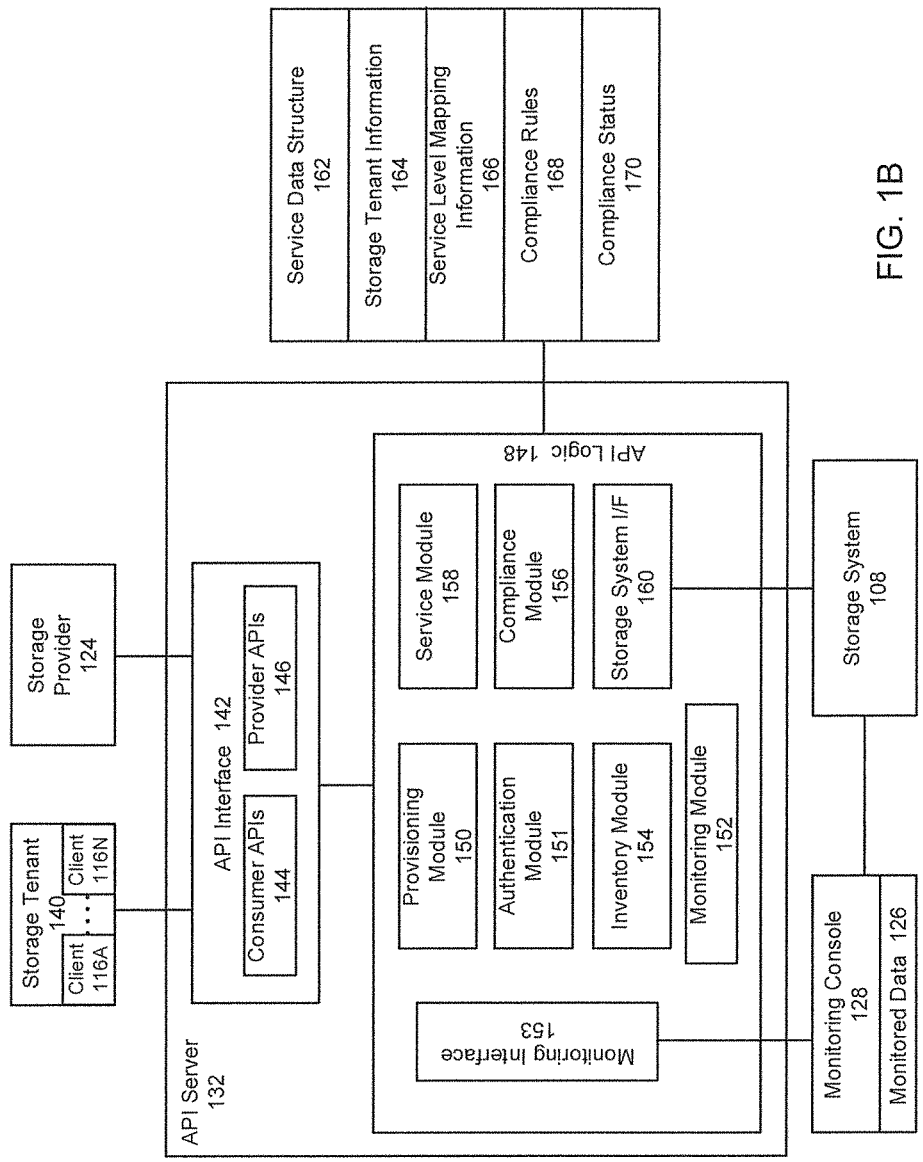
FIG. 1B shows an example of an API server, according to one aspect of the present disclosure.

API Server 132:

FIG. 1B shows an example of the API server architecture, according to one aspect of the present disclosure. The API server 132 include an interface 142 that provides consumer APIs 144 and provider APIs 146. The provider APIs are used by storage provider 124, while the consumer APIs are used by the storage tenant 140 and one or more clients for accessing storage using a storage and protection service class, as described below in detail. It is noteworthy that APIs 144 and 146 may be integrated into a single API as a REST API, where REST means "Representational State Transfer". REST is a scalable system used for building web services. REST systems/interface may use HTTP (hyper-text transfer protocol) or other protocols for communicating. When implemented as a REST API, the API module interface 142 receives a request and provides a response to the request. The response may be based on a task that is completed by API logic 148, as described below in detail. The adaptive aspects described herein are not limited to REST based APIs or any specific protocol.

In one aspect, the API server 132 may implement API logic 148 using hardware based processing logic, computer instructions and a combination thereof. API logic 148 includes a provisioning module 150 that may be used to provision storage space for a client. The provisioning module 150 may be used to setup service level objectives (SLOs) for a service level class (SLC). The SLOs may be for a storage service or for protecting stored data (referred to as protection service). The storage service SLO may provide a certain service level/class for a user that guarantees latency, throughput, storage space and other parameters defined by service level attributes described below in detail Once storage is provisioned and the service level is set, the service module 158 manages the SLOs, as described below. A compliance module 156 monitors compliance to the SLOs. In one aspect, a service data structure 162 is maintained by the API server 132. The data structure 162 may be stored locally or remotely. The data structure 162 stores storage tenant information 164, service level mapping 166, compliance rules 168 and compliance status 170. The storage tenant information 164 identifies the storage tenant, the permissions associated with the storage tenant and may also identify the storage allocated to the storage tenant. The service level mapping 166 maps storage resources (for example, a storage device, aggregate, volume storage pool and others) to a particular service level class. The compliance rules 168 define thresholds for complying with service levels, while the compliance status 170 indicates if a service level is being met.

API logic 148 may also include a storage system interface 160 that is used to communicate with the storage system 108. The storage system interface 160 may be used to obtain storage resource information from the storage system 108 to meet the service levels requested by a client.

API logic 148 may further include an inventory module 154 that may be used to discover storage resources at the storage system 108. The inventory module 154 may communicate with the storage system via the storage system interface 160. Information regarding the storage resources may be stored at a data structure, for example, 162.

The API logic 148 includes a monitoring interface 153 that communicates with the monitoring console 128 that also communicates with the storage system 108 and stores monitored data in a data structure 126. In one aspect, monitoring console 128 maintains various counters to track performance and utilization of storage resources for meeting SLOs. The counter data is stored as monitored data 126 and provided to the service module 158. It is noteworthy that although system 100 shows a separate monitoring console, the various aspects may be implemented where the monitoring console 128 is integrated with the API server 132.

The API logic 148 further includes an authentication module 151 that authenticates users/storage providers and others for accessing information or for provisioning storage.

Figure 1C:
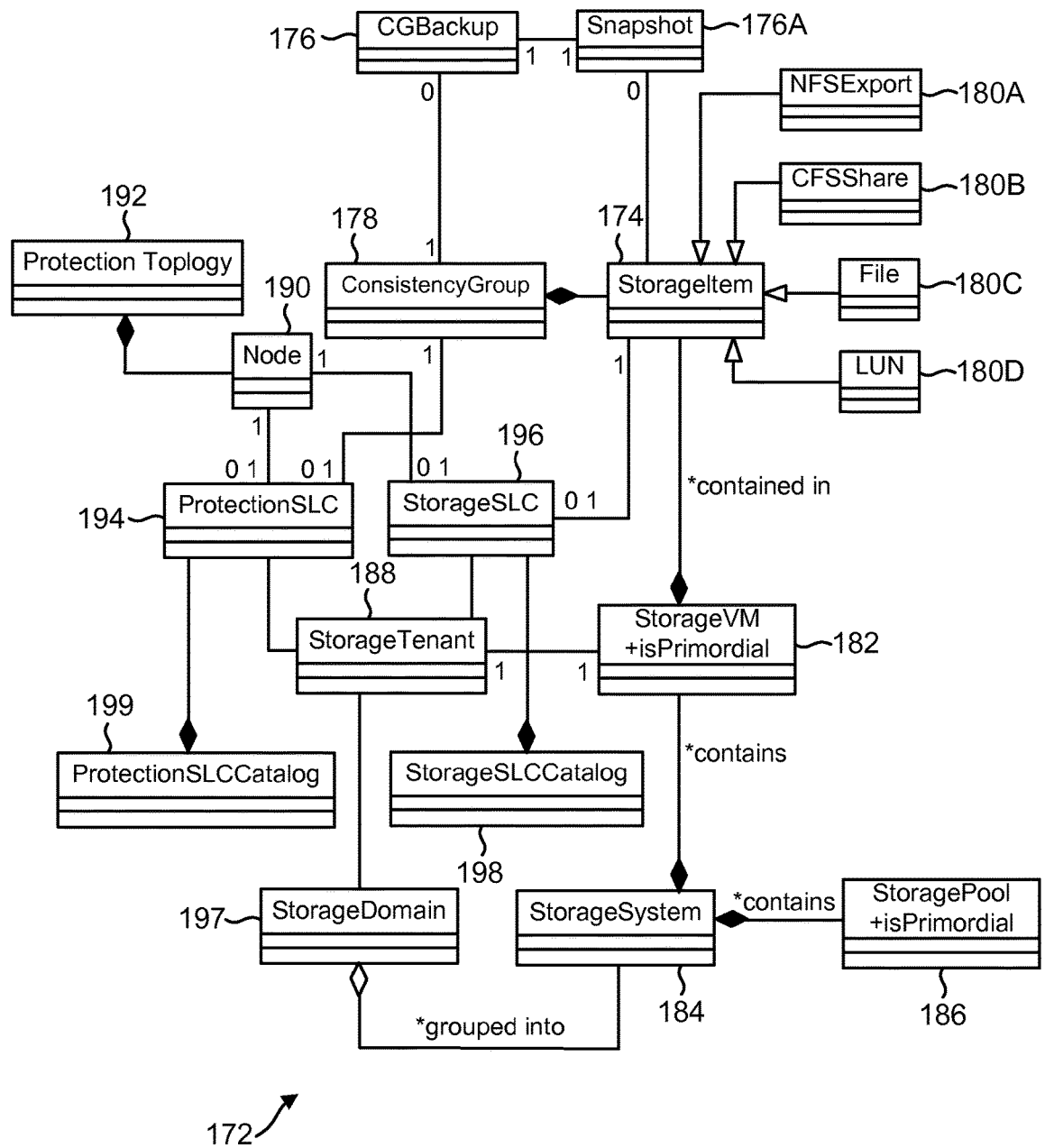
FIG. 1C shows an example of a class diagram that is used by the API server of FIG. 1A, according to one aspect of the present disclosure.

SLO Object Model:

FIG. 1C shows an object model 172 that is used by the API server 132 for generating SLCs, and monitoring storage system performance to comply with SLCs, according to one aspect. The object model includes various objects that are presented to clients/storage providers. For example, the model includes a storage item 174 that may include an NFS export 180A, a CIFS share 180B, a file 180C and a LUN 180D that may be presented for storing information at the storage system 108. The storage item 174 may be presented to the storage provider 124 that presents it to the storage tenant 140 and then to the clients or to the clients directly when the system does not use a storage provider or a storage tenant. A LUN is a logical representation of a storage unit that can be accessed using Fibre Channel or the iSCSI protocol. The storage capacity for the LUN allocated from a storage pool. A LUN may be associated with a SLC. The storage item 174 is part of a consistency group (CG) 178 that is associated with a CG backup object 176 for protecting the storage item using backups. As an example, the backup may be associated with a snapshot object 176A, which represents a point in time copy of a data container, volume or a LUN.

The storage item 174 is associated with a storage virtual machine that is presented by the storage system object 184 (for example, storage system 108 described above). The storage system object 184 is associated with a storage pool object 186 that represents one or more storage devices. The storage pool object 186 includes a designated pool of physical storage devices and a storage system may have multiple storage pools capable of delivering one or more storage service classes as defined below.

The storage VM object 182 is associated with a storage tenant object 188 that may be part of a storage domain object 197. The storage domain object 197 may include one or more storage system objects that represent storage system 184.

As an example, the properties of the storage tenant object 188 include a unique Name, a unique identifier, a list of storage service levels that the users of the storage tenant can access, a protection service that the user of the service level can access, a maximum amount of storage space that can be provisioned for the storage tenant, a maximum number of objects (for example, LUNs, Shares, Snapshots) that can be created for a tenant, credentials for a storage tenant and capacity that is being used by a storage tenant identified by an array of storage level identifier, used space and available space.

The storage tenant object 188 is associated with a storage SLC object 196 and a protection SLC object 194. SLC object 196 may be used to define SLOs for a storage item or for a group of storage items either during provisioning or later. The SLC object 196 is stored at a SLC catalog represented by a SLC catalog object 198 that may be maintained as part of the data structure 162. Once assigned, the SLO is governed by the storage SLC. In one aspect, a storage SLC is created by defining certain service attributes that define a measurable property of storage as well as data protection services. In one aspect, the storage provider 124 defines SLC by assigning specific values to service attributes, for example, latency, throughput, retention and others. In one aspect, a service attribute is defined by a numeric value, a Boolean value and others. Each service attribute may be met by the underlying storage technology, in hardware and/or software. In one aspect, a SLC may be named, for example, "Gold", "Silver" and Bronze" each defined by specific attributes.

As an example, the following provides a list of service level attributes for defining one or more SLCs. Expected latency that clients may expect for read/write operations; maximum latency for read/write operations; an expected throughput (i.e. number of read/write operations per second), a minimum throughput, space for storage items, space for snapshots, data encryption and other attributes. Space for storage items may be allocated on demand when a client writes data or it may be guaranteed.

Protection SLC object 194 is stored at a protection SLC catalog object 199 that defines the data protection SLO for the data contained within the storage item 174. For example, data protection could be operational recovery (accidental deletes, data corruption and others), disaster recovery and others. A protection SLC may be assigned to either a primary copy of the storage item at a node represented by a node object 190 or a secondary copy of the storage item that may also be represented by node 190. As an example, the attributes for a protection service may include, local backup recovery point operations (RPOs), local backup retention for a certain duration, remote backup RPO, disaster backup retention and recovery and others.

In one aspect, node object 190 is associated with a protection topology object 192 that defines data replication topology. The protection topology may be a cyclic graph with node object 190 having local backups and other nodes having remote backups. The protection topology provides blueprint of how data is protected and replicated at nodes based on a protection SLC. For example, storage items at a primary node 190 may be assigned a Gold Storage SLC and may have a protection SLC with both remote backup and disaster recovery in a synchronized mode. The node containing remote backups may be associated with a lower level SLC (e.g. a Silver class) and the node managing the disaster recovery copy may have the same class as the primary node. When provisioning storage items, data protection services may be configured by specifying a protection topology which automates creation of a storage and protection SLCs.

In one aspect, the storage provider 124 is able obtain the list of all SLO attributes that are supported by the API server 132. To obtain the attributes, the storage provider 124 sends a request (for example, "Get list of SLO Attributes") specifying attribute key, name, dimension type, SLO category, attribute enumeration key, if any and others. A response to request provides a storage service level and protection service level identifying a storage dimension type (for example, "performance", "space efficiency" and others) and a protection dimension type (for example, "local backup", "remote backup", "retention" and others). The response also provides the various attributes for the dimension types, including minimum latency value, a latency range and others. The protection level attributes include the recovery point objectives for local and remote backups as well as retention time for the backups. These attribute examples are not intended to limit the adaptive aspects of the present disclosure.

A similar request/response mechanism is used for managing the SLCs and getting information regarding the SLCs. The storage provider 124 may send a request seeking attributes of say a "Gold" class. The response will include the various attributes of the Gold class.

In another aspect, the storage provider 124 may seek to create a specific class. The storage provider 124 sends a request via API 146 to create a specific class. The class is created by the service module 158 (or the provisioning module 150).

In another aspect, protection SLCs are also managed using the request/response mechanism. The storage provider 124 requests the protection SLC for a "Gold Class" and the API logic 148 provides the various attributes for the class.

In one aspect, the storage provider 124 can create a protection topology by providing a topology name, description, a primary node, a disaster recovery node, a storage domain, a storage service level class and a protection service level class. The storage provider 124 may also obtain the existing topology for a storage object. In yet another aspect, the storage provider 124 is able to create a volume by simply specifying a storage class and service level.

In another aspect, a storage provider 124 may obtain information about a LUN, create a LUN, modify a LUN, clone a LUN and delete a LUN using the request/response mechanism. To request information regarding a LUN, the storage provider 124 specifies a LUN key (identifier). The API logic 148 then returns the LUN, LUN name, identifier of a storage VM that manages the LUN, an identifier of the storage pool where the LUN resides, the protection SLC for the LUN and the storage SLC for the LUN.

To create a LUN, the storage provider 124 sends a request via API 146 and specifies a name, size, storage service level, a storage VM (optional) and a protection service level. The provisioning module 150 then creates the LUN associates the LUN with the appropriate storage pool and sends a response to the storage provider.

A LUN clone may be generated in a similar manner, where a request specifies an existing LUN. A different storage SLC and/or protection SLC may be specified for the LUN.

To modify, a LUN, the storage provider 124 may specify the attributes that need to be changed, including name, size and SLC. If the storage provider 124 is authorized, then the LUN is modified accordingly.

Figure 1D:
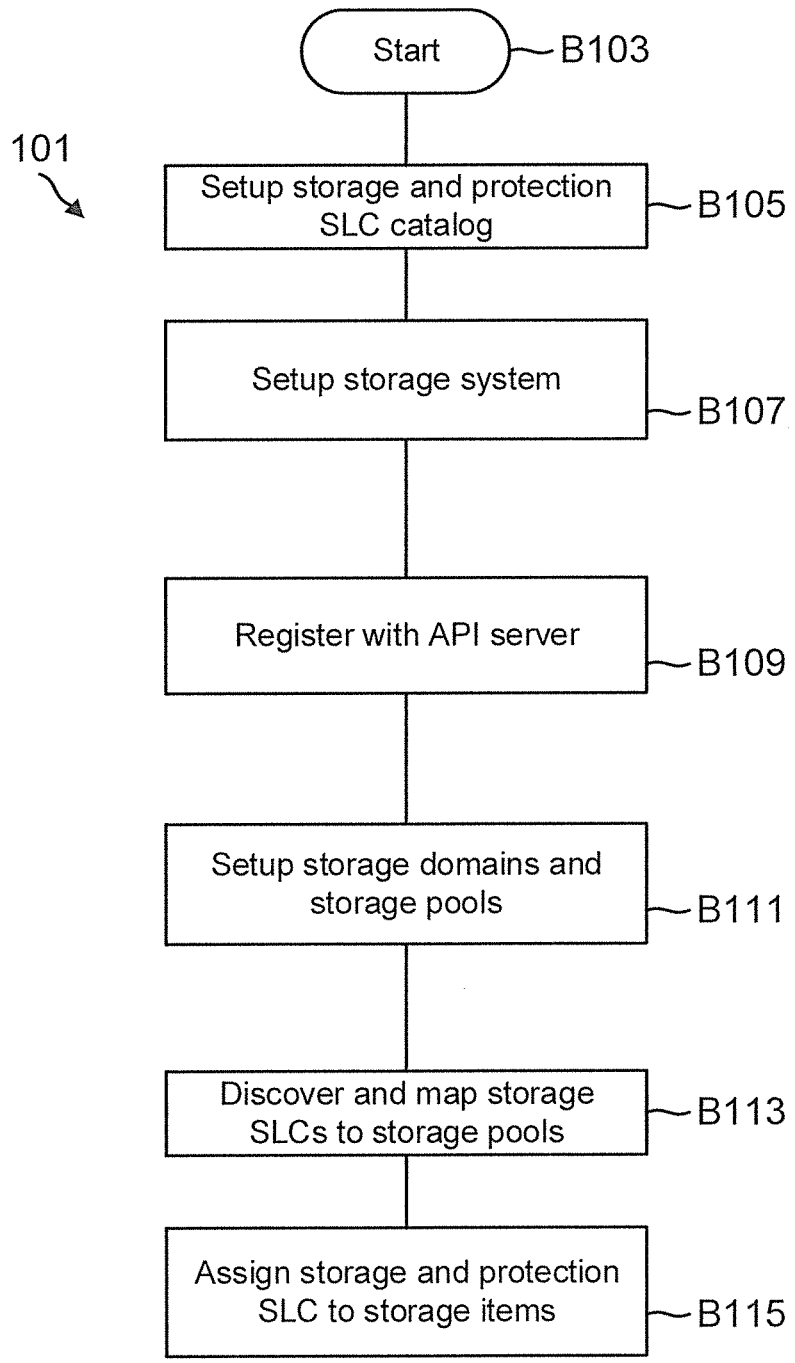
FIG. 1D shows an example of a configuration process flow for managing service level objectives, according to one aspect of the present disclosure.

Process Flows:

FIG. 1D shows a process flow 101 for setting up SLCs, according to one aspect of the present disclosure. The process begins in block B103, when the API server 132 and the storage provider 124 are initialized and operational. The storage provider 124 is provided access to provider API 146.

In block B105, the storage provider 124 defines different storage service levels that will be offered to storage tenants. The service levels are based on one or more attributes, for example, expected latency, maximum latency, expected throughput, minimum throughput, storage space for data and snapshots, data encryption and others. The different service levels are stored at data structure 162 as SLC catalog 198.

The storage provider 124 also sets up protection SLC for the storage tenants with attributes that define local backup, remote backup disaster recovery and others. The protection SLC are stored as part of protection SLC catalog 199 at data structure 162. Once the storage and protection SLC are set. The storage system 108 is setup in block B107 and may provide a storage VM in a cluster environment. In block B109, the storage system 108 is registered with the API server 132. The monitoring tools, for example, the monitoring console 128 is also registered with the API server 132. This enables the API server 132 to configure collection of monitored data and implement compliance based on SLCs.

In block B113, a storage domain and a storage pool is setup. The storage pool and the domain is assigned to the registered storage system. In block B113, storage is discovered by inventory module 154 and mapped to SLCs. Thereafter, in block B115, the storage and protection SLCs are assigned to storage items 174.

Figure 1E:
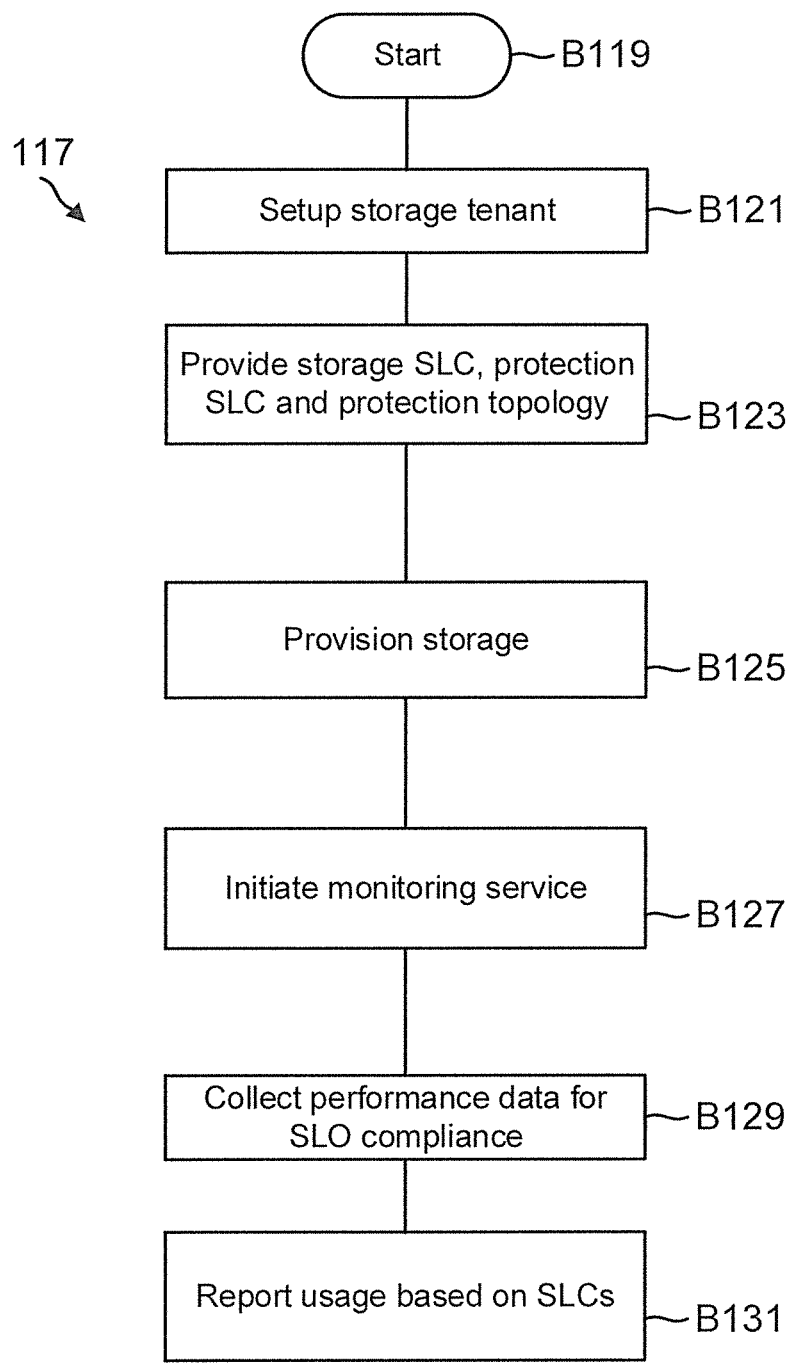
FIG. 1E shows a process flow for providing and managing service level objectives, according to one aspect of the present disclosure.

FIG. 1E shows a process 117 for using the API server 132, according to one aspect of the present disclosure. The process begins in block B119, when a storage provider 124 and the API server 132 are initialized and operational. The process blocks of FIG. 1D are executed and thus storage and protection SLCs have been defined.

In block B121, a storage tenant is configured and established. As described above, the storage tenant is assigned a unique name and identifier. One or more storage and protection SLCs and protection SLCs are assigned to the storage tenant as well. As an example, the storage provider 124 may limit the amount of space for each storage SLC, and limit the number of storage items that can be provisioned. One or more protection topology is associated with the storage tenant. Optionally, a storage tenant administrator may also be configured for interfacing with the storage provider 124 and/or the API server 132.

In block B123, storage SLC, protection SLC (and/or protection topology) is exposed to the storage tenant. In one aspect, the storage tenant queries the storage provider 124 for SLCs. The query may be based on using a consumer API 144. The storage tenant may send a query in the following format:

GET/apis/slo/storage-tenants/(tenant-key)/entitlements

The response may be as follows:

"capacity-limits" {"slc": "gold" "limit" "100 Tb" "used": "50 TB"} {"slc": "silver" "limit" "200 Tb" "used": "100 TB"

"Object-count-limits" {"type": "lun" "max-count" "100" "used": "10"} {"type": "NFSExport" "max-count" "100" "used": "50" }{"type": "Snapshot" "max-count" "5000" "used": "600" }

The foregoing example provides the storage tenant with configured storage and protection SLCs. The storage tenant can then provision storage, for example, create a LUN, NFSExport, CIFS share or File by selecting a storage SLC.

As an example, the consumer API 144 may be used to provision the storage using the following request for creating a LUN:

POST/apis/slo/lun {"name": "mylun" "size": "10 TB" "host_os": "Specify host OS" "host_fs": "vvvol" "application_storage_group": "specify" "storage_slc_key": <storage-slc-key>.

If the storage tenant is configured to have dedicated storage VM 182, then the provisioning module 150 selects the assigned storage VM in block B125. Once the storage VM is selected, then the provisioning module 182 selects a storage pool on which the storage VM is hosted that can deliver the storage SLC. Once the storage pool is selected, the storage system interface 160 creates and configures logical containers to host the storage item, for example, a volume may be created on an aggregate with the configuration prescribed in the storage SLC.

In block B127, a monitoring service is initiated to monitor compliance with the storage SLC and protection SLCs selected by the storage tenant 140. In one aspect, the various attributes of a selected SLCs are monitored. Performance data is collected in block B129 to monitor SLO compliance. For example, to monitor maximum latency, the monitoring console 128 collects read/write average latencies on storage items at an acceptable frequency. The monitoring console 128 may also collect the total IOPS for read and write operations for the storage items and compares the average number of IOPS with a certain value to ensure that a minimum IOPS are being handled for the storage item. The monitoring console 128 may also obtain storage device utilization data to ensure the space guarantee for write operations.

In another aspect, the monitoring module 152 also ensures that protection SLOs are being met. This may be enabled by ensuring that there is a snapshot of the storage item and the total number of snapshots meet the protection SLO for the storage item. The same compliance is undertaken for remote recovery point operations, remote snapshot retention and disaster recovery based on snapshots stored at remote location from the primary node of the storage item.

Based on the monitoring, in block B131, a report may be generated indicating compliance of different attributes for a SLC. In one aspect, the API server 132 reports installed, provisioned and allocated capacity by storage SLCs, storage domains and storage systems. The system may also report allocated and used storage capacity per storage tenant as well as per storage tenant per storage SLC. In another aspect, storage and protection SLCs assigned to a storage item are reported. In yet another aspect, a storage SLC that is supported by a storage pool, total and available capacity as well as available performance headroom is reported. The headroom is actual performance capacity of a resource at any given time and is based on the difference between optimal utilization of the resource and an actual usage of the resource. The optimal utilization is determined by the monitoring console 128 using one or more techniques.

In one aspect, an email may be sent to the storage provider 124 about any SLO violation of storage item. The storage provider 124 retrieves the details regarding the storage items. The violation may be due to a mismatch in configuration of the stored items and the configured SLCs or it may be due to operational issues. A root cause analysis may be performed using device/platform specific APIs (not shown) and a remedial action may be taken. The nature of the remedial action will of course depend on the reason for the violation.

The processes and mechanisms provided above simplify storage services and protection of stored data. Very little user or manual intervention is needed for provisioning and monitoring complex storage systems.

Figure 2A:
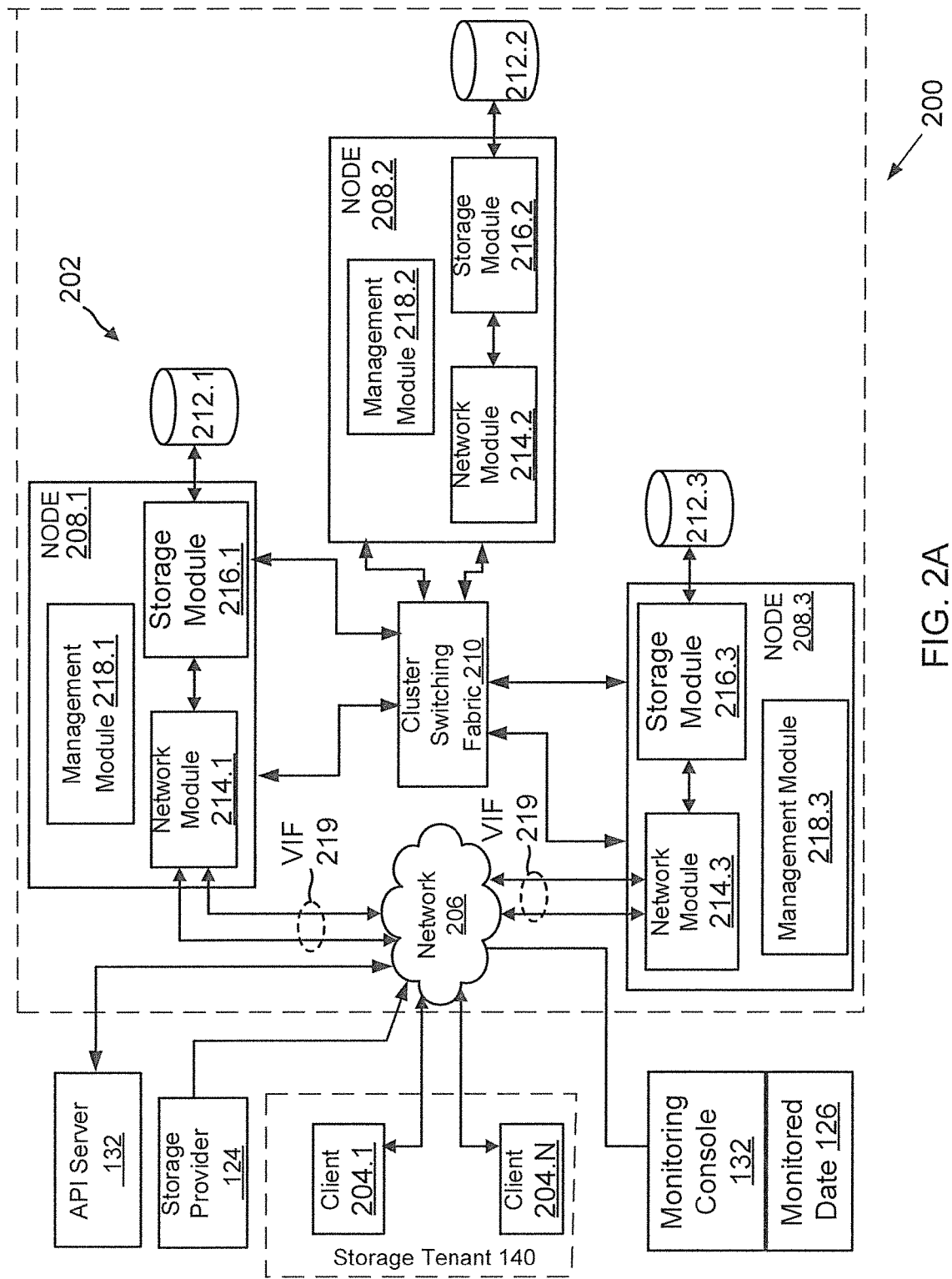
FIG. 2A shows an example of a clustered storage system, used according to one aspect of the present disclosure.

Clustered System:

FIG. 2A shows a cluster based storage environment 200 having a plurality of nodes that store data on behalf of clients. System 200 includes the API server 132, the storage provider 124, the storage tenant 140 and the monitoring console 128 that have been described above in detail Storage environment 200 may include a plurality of client systems 204.1-204.N as part of or associated with storage tenant 140, a clustered storage system 202 (similar to storage system 108) and at least a network 206 communicably connecting the client systems 204.1-204.N, the API server 132, the storage provider 124 and the clustered storage system 202. It is noteworthy that these components may interface with each other using more than one network having more than one network device.

The clustered storage system 202 includes a plurality of nodes 208.1-208.3, a cluster switching fabric 210, and a plurality of mass storage devices 212.1-212.3 (may be referred to as 212 and similar to storage device 114). Each of the plurality of nodes 208.1-208.3 is configured to include a network module, a storage module, and a management module, each of which can be implemented as a processor executable module. Specifically, node 208.1 includes a network module 214.1, a storage module 216.1, and a management module 218.1, node 208.2 includes a network module 214.2, a storage module 216.2, and a management module 218.2, and node 208.3 includes an network module 214.3, a storage module 216.3, and an management module 218.3.

The network modules 214.1-214.3 include functionality that enable the respective nodes 208.1-208.3 to connect to one or more of the client systems 204.1-204.N (or the API server 132, storage provider 124 and the monitoring console 128) over the computer network 206. The network modules handle file network protocol processing (for example, CFS, NFS and/or iSCSI requests). The storage modules 216.1-216.3 connect to one or more of the storage devices 212.1-212.3 and process I/O requests. Accordingly, each of the plurality of nodes 208.1-208.3 in the clustered storage server arrangement provides the functionality of a storage server.

The management modules 218.1-218.3 provide management functions for the clustered storage system 202. The management modules 218.1-218.3 collect storage information regarding storage devices 212 and makes it available to monitoring console 128. The management modules may also be used to configure QOS values (e.g. latency and throughput) for storage volumes that are managed by a node.

A switched virtualization layer including a plurality of virtual interfaces (VIFs) 219 is provided to interface between the respective network modules 214.1-214.3 and the client systems 204.1-204.N, allowing storage 212.1-212.3 associated with the nodes 208.1-208.3 to be presented to the client systems 204.1-204.N as a single shared storage pool.

The clustered storage system 202 can be organized into any suitable number of storage virtual machines (SVMs) (may be referred to as virtual servers (may also be referred to as "SVMs"), in which each SVM represents a single storage system namespace with separate network access. Each SVM has a client domain and a security domain that are separate from the client and security domains of other SVMs. Moreover, each SVM is associated with one or more VIFs 219 and can span one or more physical nodes, each of which can hold one or more VIFs and storage associated with one or more SVMs. Client systems can access the data on a SVM from any node of the clustered system, through the VIFs associated with that SVM.

Each of the nodes 208.1-208.3 is defined as a computing system to provide application services to one or more of the client systems 204.1-204.N. The nodes 208.1-208.3 are interconnected by the switching fabric 210, which, for example, may be embodied as a Gigabit Ethernet switch or any other type of switching/connecting device.

Although FIG. 2A depicts an equal number (i.e., 3) of the network modules 214.1-214.3, the storage modules 216.1-216.3, and the management modules 218.1-218.3, any other suitable number of network modules, storage modules, and management modules may be provided. There may also be different numbers of network modules, storage modules, and/or management modules within the clustered storage system 202. For example, in alternative aspects, the clustered storage system 202 may include a plurality of network modules and a plurality of storage modules interconnected in a configuration that does not reflect a one-to-one correspondence between the network modules and storage modules. In another aspect, the clustered storage system 202 may only include one network module and storage module.

Each client system 204.1-204.N may request the services of one of the respective nodes 208.1, 208.2, 208.3, and that node may return the results of the services requested by the client system by exchanging packets over the computer network 206, which may be wire-based, optical fiber, wireless, or any other suitable combination thereof.

Figure 2B:
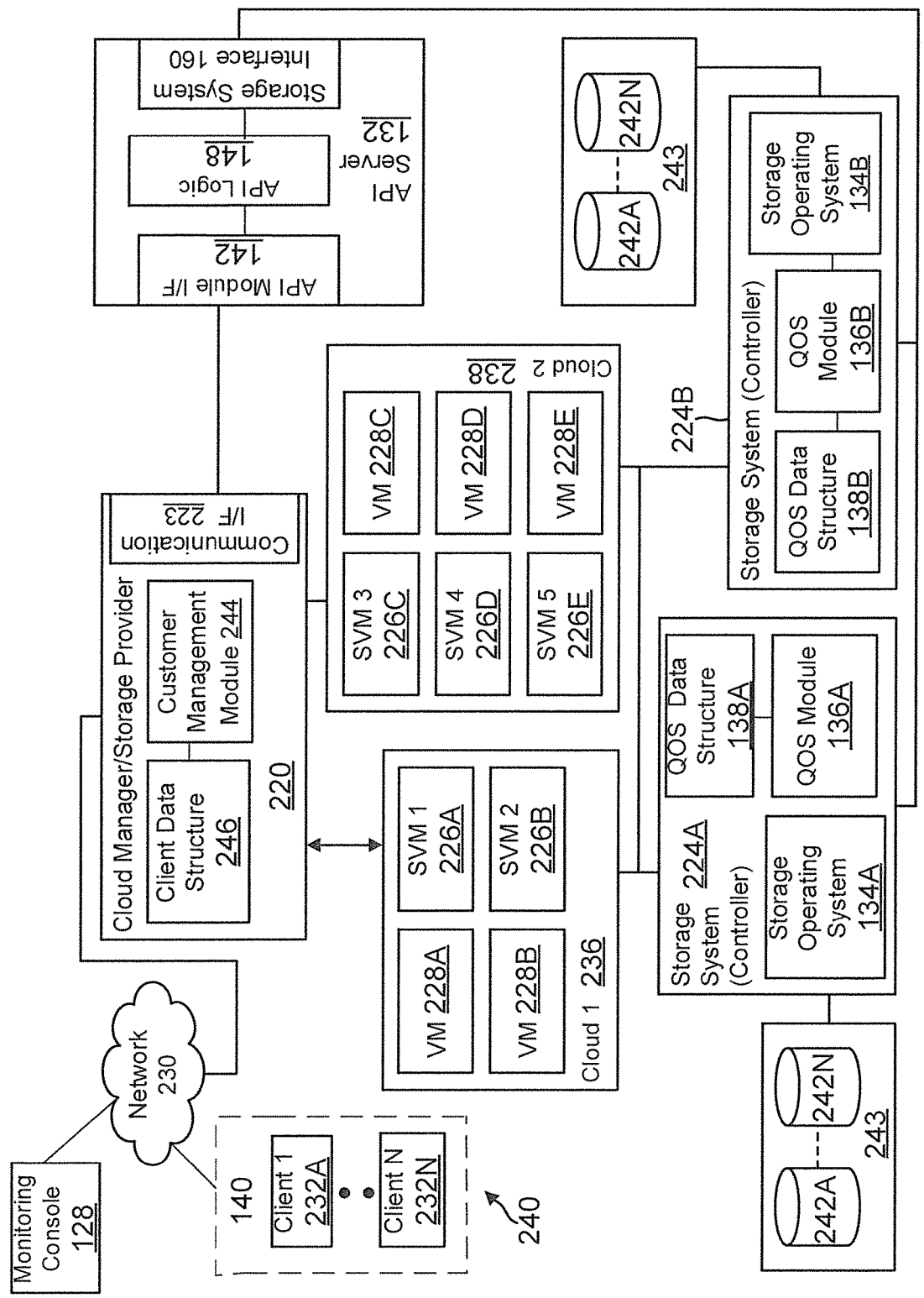
FIG. 2B shows an example of a system with a cloud manager, used according to one aspect of the present disclosure.

Cloud Environment:

FIG. 2B shows a cloud environment 240 with the API server 132, the storage provider 124 (also referred to and shown as the cloud manager 220), monitoring console 128 and clients 232A-232N, similar to 116 (FIG. 1A) that may be part of or serviced by the storage tenant 140, according to one aspect of the present disclosure. The various aspects of API server 132 have been described above and for brevity, are not repeated in the context of the cloud environment 240. It is noteworthy that the various adaptive aspects of the present disclosure are not limited to the cloud environment 240.

The cloud manager 124 includes a communication interface 223 for communicating with the API server 132 for sending requests and receiving responses. The cloud manager 124 includes a customer management module 244 that stores and manages client information at a data structure 246. The data structure 246 may store client information, for example, client identifiers, passwords, storage and protection SLCs that are assigned to clients and any other information.

In one or more aspects, cloud environment 240 may be a computing environment configured to enable network access (e.g., on-demand) to a shared pool of configurable computing resources (e.g., networks, storage, host servers, applications, and services). In one or more aspects, a storage system (or controller) 224A/224B (similar to 108) may be a hardware resource configured to host one or more SVMs in cloud environment 240. Storage system 224A and storage system 224B may be deployed by the cloud manager 124 configured to provision the host systems, storage associated with one or more client devices (e.g., client 1 232A, client N 232N) and/or services requested by the one or more client devices. As an example, storage system 224A may be configured to be associated with SVM 1 226A and SVM 3 226C, while storage system 224B may be configured to be associated with SVM 2 226B, SVM 4 226D and SVM 5 226E.

In one or more aspects, cloud manager 124 may enable one or more client devices to self-provision computing resources thereof. The cloud manager 124 may manage cloud portion(s) (e.g., cloud 1 236, cloud 2 238) associated with client 1 232A and client N 232N. Client 1 232A and/or client N 232N may log into a console associated with cloud manager 124 to access cloud 1 236 and/or cloud 2 238 (and the VMs 228A-228E therein) through a public network 230 (e.g., Internet).

In order to address storage requirements/requests associated with client 1 232 and client N 232N, cloud manager 124 may be configured to appropriately provision SVM 1 226A, SVM 2 226B, SVM 3 226C, SVM 4 226D and SVM 5 226E and then allocate the appropriate SVM to client 1 232A and client 2 232N. The aforementioned SVMs may be virtualized entities utilized by client 1 232A and client N 232N to meet storage requirements thereof. Multi-tenancy may allow for a storage system to have multiple SVMs associated therewith. A portion of the cloud (e.g., cloud 1 236) including SVM 1 226A, SVM 2 226B and VMs (e.g., VM 228A, VM 228B) associated therewith may be associated with client 1 232A and a portion of the cloud (e.g., cloud 2 238) including SVM 3 226C, SVM 4 226D and SVM 5 226E and VMs (e.g., VM 228C, VM 228D, VM 228E) associated therewith may be associated with client N 232N.

The aforementioned cloud portions may be logical subsets of the cloud and may include VMs implemented with operating systems (e.g., Linux, Microsoft®'s Windows®). "Cloud" as used herein may refer to the large pool of configurable computing resources (e.g., virtualized computing resources) that may be subjected to a pay-per-use model, in which client(s) may enter into service agreement(s) with service provider(s). The portion of the "cloud," therefore, may refer to the pool of resources associated with a particular client. It is noteworthy that client 1 232A and/or client N 232N may be entities (e.g., corporations, departments and others), and that there may be a number of computing devices associated with each of client 1 232 and/or client N 232.

Cloud 1 236 and/or cloud 2 238 may span across several geographic regions. In one or more aspects, the aforementioned cloud portions may span multiple countries under differing jurisdictional guidelines. For example, a jurisdictional guideline may deem that a SVM needs to be launched on hardware (e.g., storage system) located in the same jurisdiction as the corresponding client(s).

In one or more aspects, administrators of cloud environment 240 may possess the authority to launch one or more SVMs on any of storage system 224A and storage system 224B, irrespective of the location(s) thereof. An administrator may also modify the version of the storage operating system and/or configuration settings on storage system 224A and/or storage system 224B.

In one aspect, a client is presented with a plurality of options by a customer management module 244 of the cloud manager 124. When the client selects an option, then a client data structure 246 is updated to reflect the selection.

In one aspect, cloud environment 240 includes the API server 132 that includes the storage system interface 160 that interfaces with the storage systems 224A/224B. The storage system interface 231 may use a Zephyr Application programming Interface (ZAPI), XML or any other interface type for communication with the storage systems. The aspects described herein are not limited to any particular interface.

QOS module 136A/136B maintain the QOS data structure 138A/138B at each storage system. The QOS data structure 138A/138B identifies each storage volume (or LUN or virtual volume (vvol)) 242A-242N of a storage sub-system 243. The QOS data structure 138A/138B stores the target latency and throughput rate that is associated with each volume. The target rates may be associated during storage volume/SVM configuration using a management application. The QOS information is provided to API server 132 via the storage systems interface 160.

Figure 3:
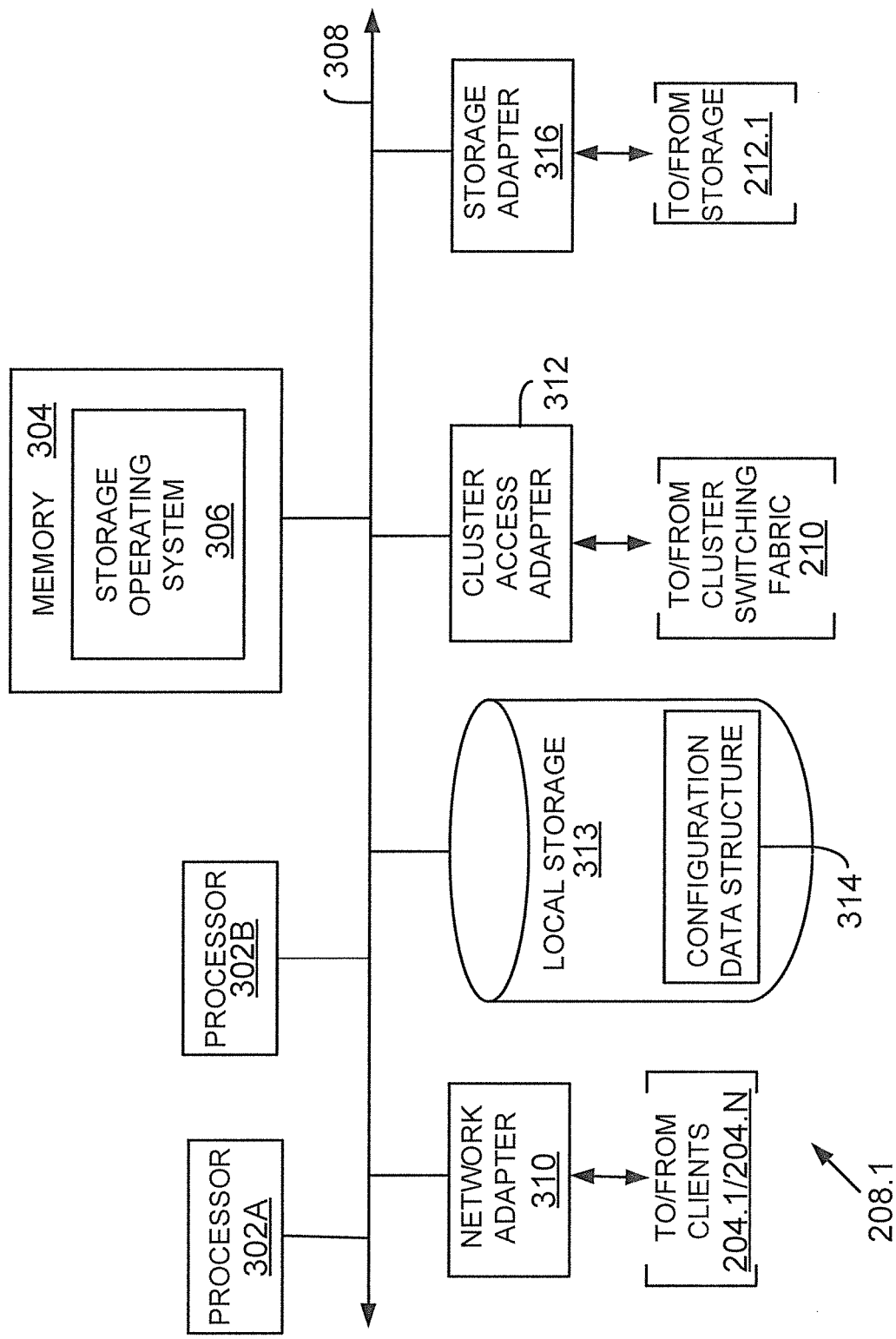
FIG. 3 shows an example of a storage system node, according to one aspect of the present disclosure.

Storage System Node:

FIG. 3 is a block diagram of a node 208.1 that is illustratively embodied as a storage system comprising of a plurality of processors 302A and 302B, a memory 304, a network adapter 310, a cluster access adapter 312, a storage adapter 316 and local storage 313 interconnected by a system bus 308. Node 208.1 may be used to provide QOS information to API server 132 and/or monitoring console 128 described above.

Processors 302A-302B may be, or may include, one or more programmable general-purpose or special-purpose microprocessors, digital signal processors (DSPs), programmable controllers, application specific integrated circuits (ASICs), programmable logic devices (PLDs), or the like, or a combination of such hardware devices. The local storage 313 comprises one or more storage devices utilized by the node to locally store configuration information for example, in a configuration data structure 314. The configuration information may include policy level information regarding storage volumes and their associated latency and throughput rates.

The cluster access adapter 312 comprises a plurality of ports adapted to couple node 208.1 to other nodes of cluster 100. In the illustrative aspect, Ethernet may be used as the clustering protocol and interconnect media, although it will be apparent to those skilled in the art that other types of protocols and interconnects may be utilized within the cluster architecture described herein. In alternate aspects where the network modules and Storage modules are implemented on separate storage systems or computers, the cluster access adapter 312 is utilized by the network/storage module for communicating with other network/storage modules in the cluster 100.

Each node 208.1 is illustratively embodied as a dual processor storage system executing a storage operating system 306 (similar to 134, FIG. 1A) that preferably implements a high-level module, such as a file system, to logically organize the information as a hierarchical structure of named directories and files on storage 212.1. However, it will be apparent to those of ordinary skill in the art that the node 208.1 may alternatively comprise a single or more than two processor systems. Illustratively, one processor 302A executes the functions of the network module 214 on the node, while the other processor 302B executes the functions of the storage module 216.

The memory 304 illustratively comprises storage locations that are addressable by the processors and adapters for storing programmable instructions and data structures. The processor and adapters may, in turn, comprise processing elements and/or logic circuitry configured to execute the programmable instructions and manipulate the data structures. It will be apparent to those skilled in the art that other processing and memory means, including various computer readable media, may be used for storing and executing program instructions pertaining to the disclosure described herein.

The storage operating system 306 portions of which is typically resident in memory and executed by the processing elements, functionally organizes the node 208.1 by, inter alia, invoking storage operation in support of the storage service implemented by the node.

The network adapter 310 comprises a plurality of ports adapted to couple the node 208.1 to one or more clients 204.1/204.N over point-to-point links, wide area networks, virtual private networks implemented over a public network (Internet) or a shared local area network. The network adapter 310 thus may comprise the mechanical, electrical and signaling circuitry needed to connect the node to the network. Illustratively, the computer network 206 may be embodied as an Ethernet network or a Fibre Channel network. Each client 204.1/204.N may communicate with the node over network 206 by exchanging discrete frames or packets of data according to pre-defined protocols, such as TCP/IP.

The storage adapter 316 cooperates with the storage operating system 306 executing on the node 208.1 to access information requested by the clients. The information may be stored on any type of attached array of writable storage device media such as video tape, optical, DVD, magnetic tape, bubble memory, electronic random access memory, micro-electro mechanical and any other similar media adapted to store information, including data and parity information. However, as illustratively described herein, the information is preferably stored on storage device 212.1. The storage adapter 316 comprises a plurality of ports having input/output (I/O) interface circuitry that couples to the storage devices over an I/O interconnect arrangement, such as a conventional high-performance, FC link topology.

Figure 4:
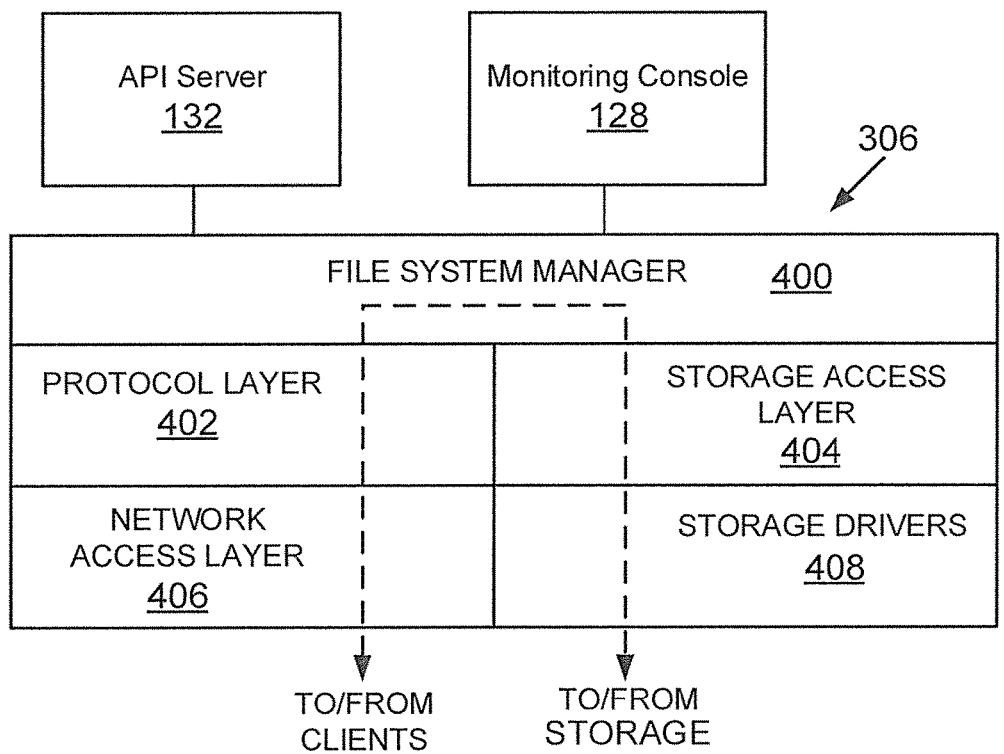
FIG. 4 shows an example of a storage operating system, used according to one aspect of the present disclosure.

Operating System:

FIG. 4 illustrates a generic example of storage operating system 306 (or 134, FIG. 1A) executed by node 208.1, according to one aspect of the present disclosure. The storage operating system 306 interfaces with API server 132 and the monitoring console 128 to ensure that proper resources are being used for SLC compliance.

In one example, storage operating system 306 may include several modules, or "layers" executed by one or both of network module 214 and Storage module 216. These layers include a file system manager 400 that keeps track of a directory structure (hierarchy) of the data stored in storage devices and manages read/write operation, i.e. executes read/write operation on storage in response to client 204.1/204.N requests.

Storage operating system 306 may also include a protocol layer 402 and an associated network access layer 406, to allow node 208.1 to communicate over a network with other systems, such as clients 204.1/204.N. Protocol layer 402 may implement one or more of various higher-level network protocols, such as NFS, CIFS, Hypertext Transfer Protocol (HTTP), TCP/IP and others.

Network access layer 406 may include one or more drivers, which implement one or more lower-level protocols to communicate over the network, such as Ethernet. Interactions between clients' and mass storage devices 212.1-212.3 (or 114) are illustrated schematically as a path, which illustrates the flow of data through storage operating system 306.

The storage operating system 306 may also include a storage access layer 404 and an associated storage driver layer 408 to allow Storage module 216 to communicate with a storage device. The storage access layer 404 may implement a higher-level storage protocol, such as RAID (redundant array of inexpensive disks), while the storage driver layer 408 may implement a lower-level storage device access protocol, such as FC or SCSI. The storage driver layer 408 may maintain various data structures (not shown) for storing information regarding storage volume, aggregate and various storage devices.

As used herein, the term "storage operating system" generally refers to the computer-executable code operable on a computer to perform a storage function that manages data access and may, in the case of a node 208.1, implement data access semantics of a general purpose operating system. The storage operating system can also be implemented as a microkernel, an application program operating over a general-purpose operating system, such as UNIX® or Windows XP®, or as a general-purpose operating system with configurable functionality, which is configured for storage applications as described herein.

In addition, it will be understood to those skilled in the art that the disclosure described herein may apply to any type of special-purpose (e.g., file server, filer or storage serving appliance) or general-purpose computer, including a stand-alone computer or portion thereof, embodied as or including a storage system. Moreover, the teachings of this disclosure can be adapted to a variety of storage system architectures including, but not limited to, a network-attached storage environment, a storage area network and a storage device directly-attached to a client or host computer. The term "storage system" should therefore be taken broadly to include such arrangements in addition to any subsystems configured to perform a storage function and associated with other equipment or systems. It should be noted that while this description is written in terms of a write any where file system, the teachings of the present disclosure may be utilized with any suitable file system, including a write in place file system.

Figure 5:
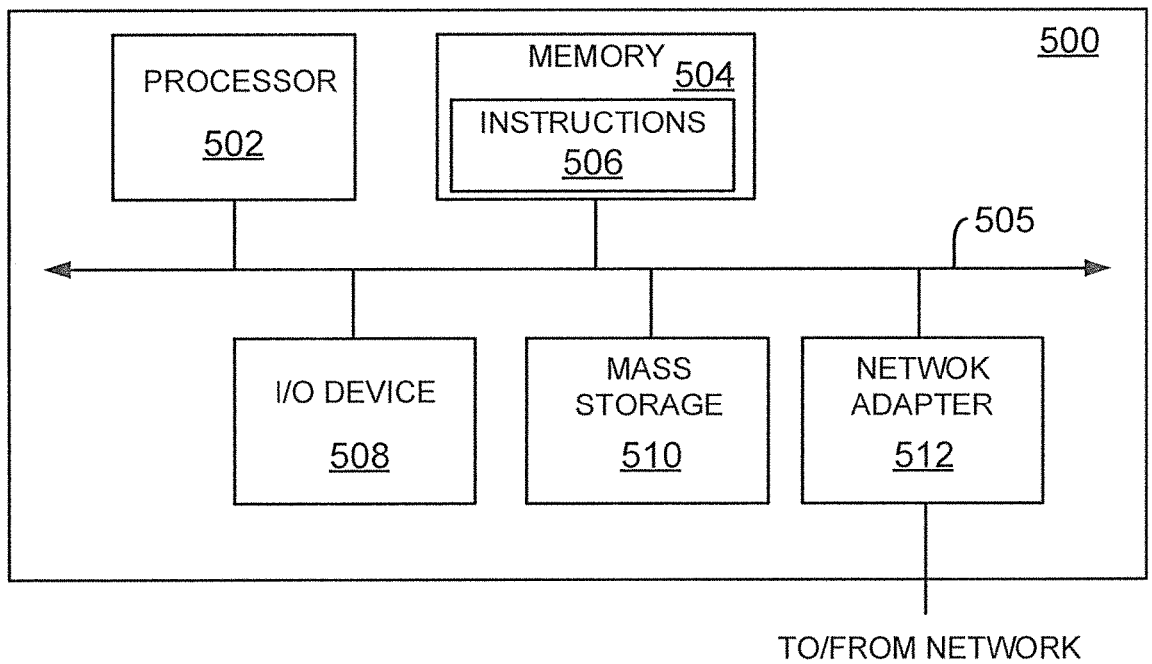
FIG. 5 shows an example of a processing system, used according to one aspect of the present disclosure.

Processing System:

FIG. 5 is a high-level block diagram showing an example of the architecture of a processing system 500 that may be used according to one aspect. The processing system 500 can represent host system 102, API server 132, monitoring console 128, clients 116, 204, 232 and/or 234, cloud manager 124, or storage system 108/224A/224B. Note that certain standard and well-known components which are not germane to the present aspects are not shown in FIG. 5.

The processing system 500 includes one or more processor(s) 502 and memory 504, coupled to a bus system 505. The bus system 505 shown in FIG. 5 is an abstraction that represents any one or more separate physical buses and/or point-to-point connections, connected by appropriate bridges, adapters and/or controllers. The bus system 505, therefore, may include, for example, a system bus, a Peripheral Component Interconnect (PCI) bus, a HyperTransport or industry standard architecture (ISA) bus, a small computer system interface (SCSI) bus, a universal serial bus (USB), or an Institute of Electrical and Electronics Engineers (IEEE) standard 1394 bus (sometimes referred to as "Firewire").

The processor(s) 502 are the central processing units (CPUs) of the processing system 500 and, thus, control its overall operation. In certain aspects, the processors 502 accomplish this by executing software stored in memory 504. A processor 502 may be, or may include, one or more programmable general-purpose or special-purpose microprocessors, digital signal processors (DSPs), programmable controllers, application specific integrated circuits (ASICs), programmable logic devices (PLDs), or the like, or a combination of such devices.

Memory 504 represents any form of random access memory (RAM), read-only memory (ROM), flash memory, or the like, or a combination of such devices. Memory 504 includes the main memory of the processing system 500. Instructions 506 may be used to implement the process steps of FIGS. 1D and 1E described above may reside in and execute (by processors 502) from memory 504.

Also connected to the processors 502 through the bus system 505 are one or more internal mass storage devices 510, and a network adapter 512. Internal mass storage devices 510 may be, or may include any conventional medium for storing large volumes of data in a non-volatile manner, such as one or more magnetic or optical based disks. The network adapter 512 provides the processing system 500 with the ability to communicate with remote devices (e.g., storage servers) over a network and may be, for example, an Ethernet adapter, a Fibre Channel adapter, or the like.

The processing system 500 also includes one or more input/output (I/O) devices 508 coupled to the bus system 505. The I/O devices 508 may include, for example, a display device, a keyboard, a mouse, etc.

Thus, a method and apparatus for managing storage and protection services have been described. Note that references throughout this specification to "one aspect" (or "embodiment") or "an aspect" mean that a particular feature, structure or characteristic described in connection with the aspect is included in at least one aspect of the present disclosure. Therefore, it is emphasized and should be appreciated that two or more references to "an aspect" or "one aspect" or "an alternative aspect" in various portions of this specification are not necessarily all referring to the same aspect. Furthermore, the particular features, structures or characteristics being referred to may be combined as suitable in one or more aspects of the disclosure, as will be recognized by those of ordinary skill in the art.

While the present disclosure is described above with respect to what is currently considered its preferred aspects, it is to be understood that the disclosure is not limited to that described above. To the contrary, the disclosure is intended to cover various modifications and equivalent arrangements within the spirit and scope of the appended claims.

What is claimed is:

1. A machine implemented method, comprising:
maintaining by a processor, an object model for providing varying level of storage services and data protection services for storage objects presented to client systems of a networked storage system;
wherein the object model comprises:
a storage service level class (SLC) object defining one or more SLCs for providing storage services to the client systems for the storage objects, based on a service level objective (SLO), wherein each storage SLC is defined by one or more storage attributes including latency and throughput associated with processing read and write requests for storing and retrieving data from the networked storage system; and wherein the storage SLC object is associated with a storage object that is associated with a storage tenant object representing a client system in the object model;
a protection topology object defining data replication topologies for protecting storage objects at the networked storage system, based on which a protection SLC is configured as a protection SLC object and associated with the storage object within the object model; and
a storage virtual machine object representing a storage virtual machine and associated with a storage server object representing a storage server that is associated with a storage pool object having a plurality of storage devices for storing data for the client systems; wherein the storage virtual machine object is associated with the storage tenant object for managing storage SLCs and protection SLCs;
using by the processor, the storage SLC object for a storage SLC to configure a SLO for the storage object and using the protection SLC object for defining a protection topology for the storage object;
in response to a request, presenting by the processor the storage SLC defined by a storage attribute of the storage SLC object and a protection SLC defined by a protection attribute of the protection SLC object for the storage object, wherein the storage attribute provides a performance level for the storage object and the protection attribute provides a protection level for the storage object;
identifying by the processor, a first resource from the storage pool object for complying with the storage attribute of the storage SLC for storing data associated with the storage object;
configuring by the processor, a second resource for complying with the protection attribute of the protection SLC for storing data associated with the storage object;
executing protection SLC related operations defined by the protection SLC object to comply with protection SLO;
monitoring by the processor, the first resource for compliance with the storage attribute for the storage SLC; and
executing by the processor remedial action associated with a SLO violation for the storage object, the remedial action based on a SLO violation type.

2. The method of claim 1, wherein the request is received by an application programming interface (API) exposed to the client system.

3. The method of claim 1, wherein the storage attribute is one of an expected latency for processing an input/output request, a maximum latency for processing the I/O request, an expected throughput and a minimum throughput for transferring data for the storage object.

4. The method of claim 1, wherein the protection attribute defines a backup for the storage object.

5. The method of claim 4, wherein the protection attribute provides that the backup is at a local storage site and a remote storage site.

6. The method of claim 1, wherein in response to the request, the processor provides a plurality of storage SLCs and a plurality of protection SLCs for a client to store information using the storage server.

7. The method of claim 1, wherein the first resource is storage space at a storage device used by the storage server to store information for the storage object.

8. A non-transitory, machine readable medium having stored thereon instructions comprising machine executable code which when executed by a machine, causes the machine to:
maintain by a processor, an object model for providing varying level of storage services and data protection services for storage objects presented to client systems of a networked storage system; wherein the object model comprises:

a storage service level class (SLC) object defining one or more SLCs for providing storage services to the client systems for the storage objects, based on a service level objective (SLO), wherein each storage SLC is defined by one or more storage attributes including latency and throughput associated with processing read and write requests for storing and retrieving data from the networked storage system; and wherein the storage SLC object is associated with a storage object that is associated with a storage tenant object representing a client system in the object model;

a protection topology object defining data replication topologies for protecting storage objects at the networked storage system, based on which a protection SLC is configured as a protection SLC object and associated with the storage object within the object model; and a storage virtual machine object representing a storage virtual machine and associated with a storage server object representing a storage server that is associated with a storage pool object having a plurality of storage devices for storing data for the client systems; wherein the storage virtual machine object is associated with the storage tenant object for managing storage SLCs and protection SLCs;

use by the processor, the storage SLC object for a storage SLC to configure a SLO for the storage object and use the protection SLC object for defining a protection topology for the storage object;

in response to a request, presenting by the processor the storage SLC defined by a storage attribute of the storage SLC object and a protection SLC defined by a protection attribute of the protection SLC object for the storage object, wherein the storage attribute provides a performance level for the storage object and the protection attribute provides a protection level for the storage object;

identify by the processor, a first resource from the storage pool object for complying with the storage attribute of the storage SLC for storing data associated with the storage object;

configure by the processor, a second resource for complying with the protection attribute of the protection SLC for storing data associated with the storage object;

execute protection SLC related operations defined by the protection SLC object to comply with protection SLO;

monitor by the processor, the first resource for compliance with the storage attribute for the storage SLC; and execute by the processor remedial action associated with a SLO violation for the storage object, the remedial action based on a SLO violation type.

9. The storage medium of claim 8, wherein the request is received by an application programming interface (API) exposed to the client system.

10. The storage medium of claim 8, wherein the storage attribute is one of an expected latency for processing an input/output request, a maximum latency for processing the I/O request, an expected throughput and a minimum throughput for transferring data for the storage object.

11. The storage medium of claim 8, wherein the protection attribute defines a backup for the storage object.

12. The storage medium of claim 11, wherein the protection attribute provides that the backup is at a local storage site and a remote storage site.

13. The storage medium of claim 8, wherein in response to the request, the processor provides a plurality of storage SLCs and a plurality of protection SLCs for a client to store information using the storage server.

14. The storage medium of claim 8, wherein the first resource is storage space at a storage device used by the storage server to store information for the storage object.

15. A system, comprising:

a memory containing machine readable medium comprising machine executable code having stored thereon instructions; and a processor module coupled to the memory, the processor module configured to execute the machine executable code to:

maintain an object model for providing varying level of storage services and data protection services for storage objects presented to client systems of a networked storage system; wherein the object model comprises:

a storage service level class (SLC) object defining one or more SLCs for providing storage services to the client systems for the storage objects, based on a service level objective (SLO), wherein each storage SLC is defined by one or more storage attributes including latency and throughput associated with processing read and write requests for storing and retrieving data from the networked storage system; and wherein the storage SLC object is associated with a storage object that is associated with a storage tenant object representing a client system in the object model;

a protection topology object defining data replication topologies for protecting storage objects at the networked storage system, based on which a protection SLC is configured as a protection SLC object and associated with the storage object within the object model; and a storage virtual machine object representing a storage virtual machine and associated with a storage server object representing a storage server that is associated with a storage pool object having a plurality of storage devices for storing data for the client systems; wherein the storage virtual machine object is associated with the storage tenant object for managing storage SLCs and protection SLCs;

use the storage SLC object for a storage SLC to configure a SLO for the storage object and use the protection SLC object for defining a protection topology for the storage object;

in response to a request, present the storage SLC defined by a storage attribute of the storage SLC object and a protection SLC defined by a protection attribute of the protection SLC object for the storage object, wherein the storage attribute provides a performance level for the storage object and the protection attribute provides a protection level for the storage object;

identify a first resource from the storage pool object for complying with the storage attribute of the storage SLC for storing data associated with the storage object;

configure a second resource for complying with the protection attribute of the protection SLC for storing data associated with the storage object;

execute protection SLC related operations defined by the protection SLC object to comply with protection SLO;

monitor the first resource for compliance with the storage attribute for the storage SLC; and execute remedial action associated with a SLO violation for the storage object, the remedial action based on a SLO violation type.

16. The system of claim 15, wherein the request is received by an application programming interface (API) exposed to the client system.

17. The system of claim 15, wherein the storage attribute is one of an expected latency for processing an input/output request, a maximum latency for processing the I/O request, an expected throughput and a minimum throughput for transferring data for the storage object.

18. The system of claim 15, wherein the protection attribute defines a backup for the storage object.

19. The system of claim 18, wherein the protection attribute provides that the backup is at a local storage site and a remote storage site.

20. The system of claim 15, wherein in response to the request, the processor provides a plurality of storage SLCs and a plurality of protection SLCs for a client to store information using the storage server.

* * * * *